(12) United States Patent
Xu et al.

(10) Patent No.: US 12,227,076 B2
(45) Date of Patent: Feb. 18, 2025

(54) HYBRID POWER DRIVE SYSTEM

(71) Applicant: BorgWarner US Technologies LLC, Wilmington, DE (US)

(72) Inventors: Xiangdong Xu, Shanghai (CN); Jie Gu, Shanghai (CN); Yi Shi, Beijing (CN); Lin Fan, Shanghai (CN); Jiancheng Xin, Shanghai (CN)

(73) Assignee: BorgWarner US Technologies LLC, Wilmington, DE (US)

( * ) Notice: Subject to any disclaimer, the term of this patent is extended or adjusted under 35 U.S.C. 154(b) by 346 days.

(21) Appl. No.: 17/760,167

(22) PCT Filed: Feb. 4, 2021

(86) PCT No.: PCT/CN2021/075292
§ 371 (c)(1),
(2) Date: Aug. 4, 2022

(87) PCT Pub. No.: WO2021/155823
PCT Pub. Date: Aug. 12, 2021

(65) Prior Publication Data
US 2023/0049565 A1    Feb. 16, 2023

(30) Foreign Application Priority Data
Feb. 6, 2020   (CN) .......................... 202010081754.X

(51) Int. Cl.
*B60K 6/442*     (2007.10)
*B60K 6/387*     (2007.10)
*B60K 6/547*     (2007.10)

(52) U.S. Cl.
CPC .............. *B60K 6/442* (2013.01); *B60K 6/387* (2013.01); *B60K 6/547* (2013.01)

(58) Field of Classification Search
CPC ........ B60K 6/442; B60K 6/387; B60K 6/547; B60K 6/36; B60K 6/485; B60K 2006/264;
(Continued)

(56) References Cited

U.S. PATENT DOCUMENTS 9,254,737 B2 *   2/2016   Kaltenbach ............ B60K 6/547
10,221,787 B2 *  3/2019   Banker ................. F02D 11/105
(Continued)

FOREIGN PATENT DOCUMENTS

CN        1772524 A    *  5/2006    ............. B60K 6/365
CN        1778588 A       5/2006
(Continued)

OTHER PUBLICATIONS

FR 2814121 A1 English Translation (Year: 2002).*
(Continued)

*Primary Examiner* — James A Shriver, II
*Assistant Examiner* — Michael T. Walsh
(74) *Attorney, Agent, or Firm* — Joshua M. Haines; Bookoff McAndrews, PLLC

(57) ABSTRACT

The invention relates to a hybrid power drive system, comprising: an internal combustion engine having a crankshaft; a first electric motor (14), wherein the first electric motor (14) is an outer rotor electric motor, and comprises an outer rotor (14.2) that is rigidly connected to the crankshaft and rotates together with the crankshaft; a transmission (15) comprising an input shaft (20); and a clutch (18) that is provided between the first electric motor (14) and the transmission (15), and is connected to the input shaft (20) of the transmission. The clutch (18) is configured to be capable of switching between the following positions: an engagement position where the clutch (18) is engaged with the outer rotor (14.2); and a separation position where the clutch
(Continued)

(18) is separated from the outer rotor (14.2). The present system is simple in structure, high in efficiency, and low in manufacturing and maintenance costs.

9 Claims, 5 Drawing Sheets

(58) Field of Classification Search
CPC ...... B60K 6/26; B60K 1/02; B60K 2006/541; B60K 17/02; B60K 6/38; B60K 6/40; B60K 6/42; B60W 10/06; B60W 10/08; B60W 20/40; B60W 10/111; B60W 10/02; B60W 10/10; B60W 20/20; Y02T 10/62
See application file for complete search history.

(56) References Cited

U.S. PATENT DOCUMENTS

| | | | |
|---|---|---|---|
| 11,338,663 B2 * | 5/2022 | Kaltenbach | B60K 6/48 |
| 2002/0079853 A1 | 6/2002 | Schmitz et al. | |
| 2007/0069696 A1 * | 3/2007 | Denner | B60L 7/14 322/12 |
| 2013/0186233 A1 * | 7/2013 | Kaltenbach | F16H 3/089 903/902 |
| 2021/0031610 A1 * | 2/2021 | Yu | B60K 1/02 |
| 2024/0239180 A1 * | 7/2024 | Beck | B60K 6/40 |

FOREIGN PATENT DOCUMENTS

| | | | | | |
|---|---|---|---|---|---|
| CN | 1971104 | A | * | 5/2007 | ............ B60K 6/24 |
| CN | 102019850 | A | * | 4/2011 | ............ F16H 3/006 |
| CN | 102224031 | A | * | 10/2011 | ............ B60K 6/387 |
| CN | 105083271 | A | | 11/2015 | |
| CN | 108749552 | A | | 11/2018 | |
| DE | 102015100154 | A1 | * | 7/2015 | ......... B60W 10/023 |
| DE | 102014207997 | A1 | * | 10/2015 | ............ B60W 10/08 |
| FR | 2814121 | A1 | * | 3/2002 | ............ B60K 6/26 |
| WO | WO-2015113420 | A1 | * | 8/2015 | ............ B60K 1/02 |

OTHER PUBLICATIONS

CN 1772524 A English Translation (Year: 2006).*
CN 102224031 A English Translation (Year: 2011).*
WO 2015113420 A1 English Translation (Year: 2015).*
DE 102015100154 A1 English Translation (Year: 2015).*
China National Intellectual Property Administration, International Search Report, PCT/CN2021/075292, May 8, 2021, 7 pages, China.

* cited by examiner

HYBRID POWER DRIVE SYSTEM

CROSS-REFERENCE TO RELATED APPLICATION(S)

This patent application is a National Stage Application under 35 U.S.C. § 371 of International Patent Application No. PCT/CN2021/075292, filed on Feb. 4, 2021, which claims priority to Chinese Application No. 202010081754.X, filed on Feb. 6, 2020.

FIELD OF INVENTION

The present invention relates to the field of motor vehicles. More specifically, it relates to hybrid vehicles, in particular to power drive systems for hybrid vehicles.

BACKGROUND

New energy vehicles become more and more popular due to increasingly strict regulations on $CO_2$ emissions and growing awareness of environmental issues. These new energy vehicles include hybrid and pure electric systems, of which hybrids have more advantages over pure electric systems in terms of range, ease of use, and subsequent maintenance.

The hybrid system comprises a power structure that uses a conventional internal combustion engine and an electric motor to provide power to the vehicle, wherein the electric motor can be arranged in the following positions:

P0: the electric motor is arranged at the front end of the internal combustion engine and is connected to the engine of the internal combustion engine by means of a connection device, such as a belt.

P1: the electric motor is arranged at the rear end of an internal combustion engine and is connected to a crankshaft of the internal combustion engine.

P2: the electric motor is arranged between the internal combustion engine and a transmission and is connected by a clutch.

P3: the electric motor is arranged between the transmission and a differential; and P4: the electric motor is arranged in the rear axle of the vehicle.

Among these arrangements, the P1/P3 dual electric motor hybrid system is of interest. The conventional P1/P3 system comprises an internal combustion engine, two electric motors, a transmission, and a clutch. The first motor is directly connected to the engine crankshaft and the clutch is provided between the first motor and the transmission to allow the first motor to be disengaged from and engaged with the transmission. The second motor is provided at downstream of the transmission and is connected to the transmission.

Such a hybrid configuration allows the clutch to disengage the first electric motor from the transmission when the vehicle is running at low or medium speeds, and the vehicle is driven only by the second electric motor; when the vehicle is running at high speed, the clutch engages the first electric motor with the transmission to drive the vehicle through the internal combustion engine. Wherein, when the clutch is disengaged, the internal combustion engine can continue working to drive the first electric motor and generate power.

However, in existing hybrid power drives the electric motor is usually arranged inside the gearbox of the transmission as a single unit. In this way, the connection between the internal combustion engine and the electric motor is not rigid, e.g. by means of a torque damping device. As a result, a specially designed clutch with a hydraulic mechanism is required to be compatible with the existing system, resulting in complicated and high cost of the structural design of the entire system.

In addition, in order to meet higher emission and environmental protection requirements, the cylinder deactivation technology of internal combustion engine is gradually adopted. This technology is also known as variable displacement technology, meaning that when the internal combustion engine is running under partial load, the fuel supply, ignition and intake and exhaust of some cylinders are cut off through relevant mechanisms, and the work thereof is stopped to increase the load rate of the remaining working cylinders, to improve efficiency and reduce fuel consumption. However, this technology has not been able to successfully be compatible with the present hybrid system, especially in the case of low combustion density of the internal combustion engines, the power output appears to fluctuate greatly and the resulting large amount of jitter, thereby reducing the operational reliability of the entire system and reducing the service life. In this case, the hybrid power drive system in the prior art cannot be well compatible with the cylinder deactivation technology.

SUMMARY OF INVENTION

It should be noted that the purpose of the present invention is to overcome one or more drawbacks that have been found in the background art.

To this end, the present invention provides a hybrid power drive system comprising:
  an internal combustion engine having a crankshaft;
  a first electric motor which is an outer-rotor electric motor having an outer-rotor which is rigidly coupled with the crankshaft and rotates with the crankshaft;
  a transmission having an input shaft; and
  a clutch, which is disposed between the first electric motor and the transmission and is coupled with the input shaft of the transmission, wherein the clutch is configured to be switched between the following two positions:
    an engagement position, wherein the clutch engages with the outer-rotor; and
    a separation position, wherein the clutch disengages from the outer-rotor.

According to the above arrangement, the hybrid power drive system according to the present invention can be better compatible with the existing internal combustion engine, and can use a conventional clutch with a simpler structure. This can improve the efficiency of the system and reduce the complexity and manufacturing cost of the system.

Further, according to an embodiment of the hybrid power drive system of the present invention, the clutch in the present invention is a single plate clutch.

Optionally, the clutch comprises a single plate and a clutch actuator, wherein the clutch actuator may be a simple manual mechanical device and is adapted to engage the single plate with the outer-rotor when the clutch is in the engagement position, and to disengage the single plate from the outer-rotor when the clutch is in the separation position. In this way, the present invention eliminates the need for clutches such as multi-plate clutches with hydraulic actuators used in the prior art. The mechanical single-plate clutch with simple structure and compact size can be used in the present invention, thereby reducing the manufacturing cost.

Furthermore, the transmission comprises an output shaft, a drive gear, a differential gear and countershaft, wherein the output shaft is cylindrical and coaxially arranged with the input shaft to rotate around the input shaft, the drive gear is disposed on the input shaft, and the countershaft has countershaft gears, wherein the drive gear is coupled, via the countershaft gears of the countershaft, to the differential gear.

Optionally, the transmission further comprises a synchronizer and a shift actuator, wherein the synchronizer is disposed on the output shaft and the shift actuator is configured to actuate the synchronizer to engage or disengage the input shaft with the output shaft. This smoothly synchronizes the rotation speed of the transmission input and output shafts to avoid collision and damage due to excessive speed differences between the two.

Optionally, the transmission further comprises a park pawl disposed on the output shaft and a parking lock actuator, wherein the parking lock actuator is adapted to engage with or disengage from the park pawl, to lock and unlock the rotation of the output shaft.

Furthermore, the hybrid power drive system according to the present invention further comprises a second rotary electric motor which is arranged at the downstream of the transmission and is coupled with the transmission, wherein, a second clutch may additionally be provided between the second electric motor and the transmission.

Furthermore, in the hybrid power drive system according to the present invention, the internal combustion engine includes a plurality of cylinders connected to the crankshaft and comprises a cylinder deactivation apparatus configured to selectively deactivate part of the cylinders.

Furthermore, the hybrid power drive system according to the present invention, further comprises a central processing unit configured to operate the system in one of the following operation modes:
- pure electric drive mode (also known as EV mode), wherein the internal combustion engine and the first electric motor are not involved in vehicle power output, and only the second electric motor is involved in the power output;
- hybrid drive mode, wherein the internal combustion engine, the first and the second electric motors are together involved in power output;
- direct drive mode, wherein the second electric motor is not involved in vehicle power output, and the internal combustion engine and the first electric motor are involved in the power output.

The characteristics and advantages of other aspects of the present invention will be discussed in the following embodiments. Those skilled in the art can clearly understand the content of the present invention and the technical effects obtained based on these exemplary embodiments.

BRIEF DESCRIPTION OF THE DRAWINGS

It should be understood that, in the present invention, all features, modifications, and/or specific embodiments can be combined according to various combinations except for obvious contradictions or incompatibility.

The other features and advantages of the present invention will be apparent by referring to the following specific embodiments without limiting the invention, in conjunction with the accompanying drawings, in which.

DESCRIPTION OF EMBODIMENTS

The following are exemplary embodiments according to the present invention. The relevant definitions below are used to describe exemplary embodiments, rather than to limit the scope of the present invention. Since the embodiments described here are exemplary, they can also be extended to modifications related to the function, purpose, and/or structure of the present invention.

Figure 1:
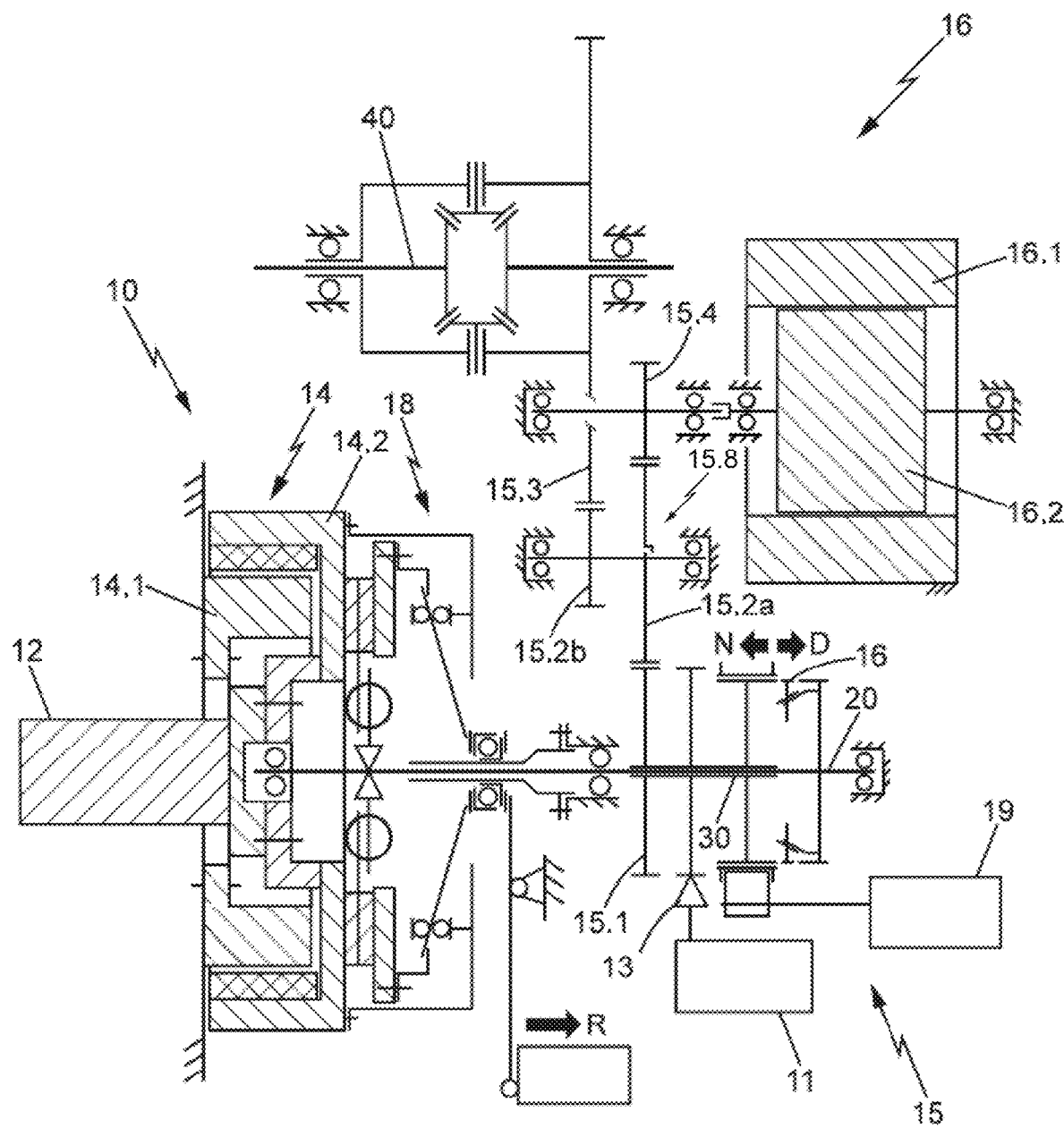
FIG. 1 is a schematic diagram of a hybrid power drive system according to the present invention.
Figure 2:
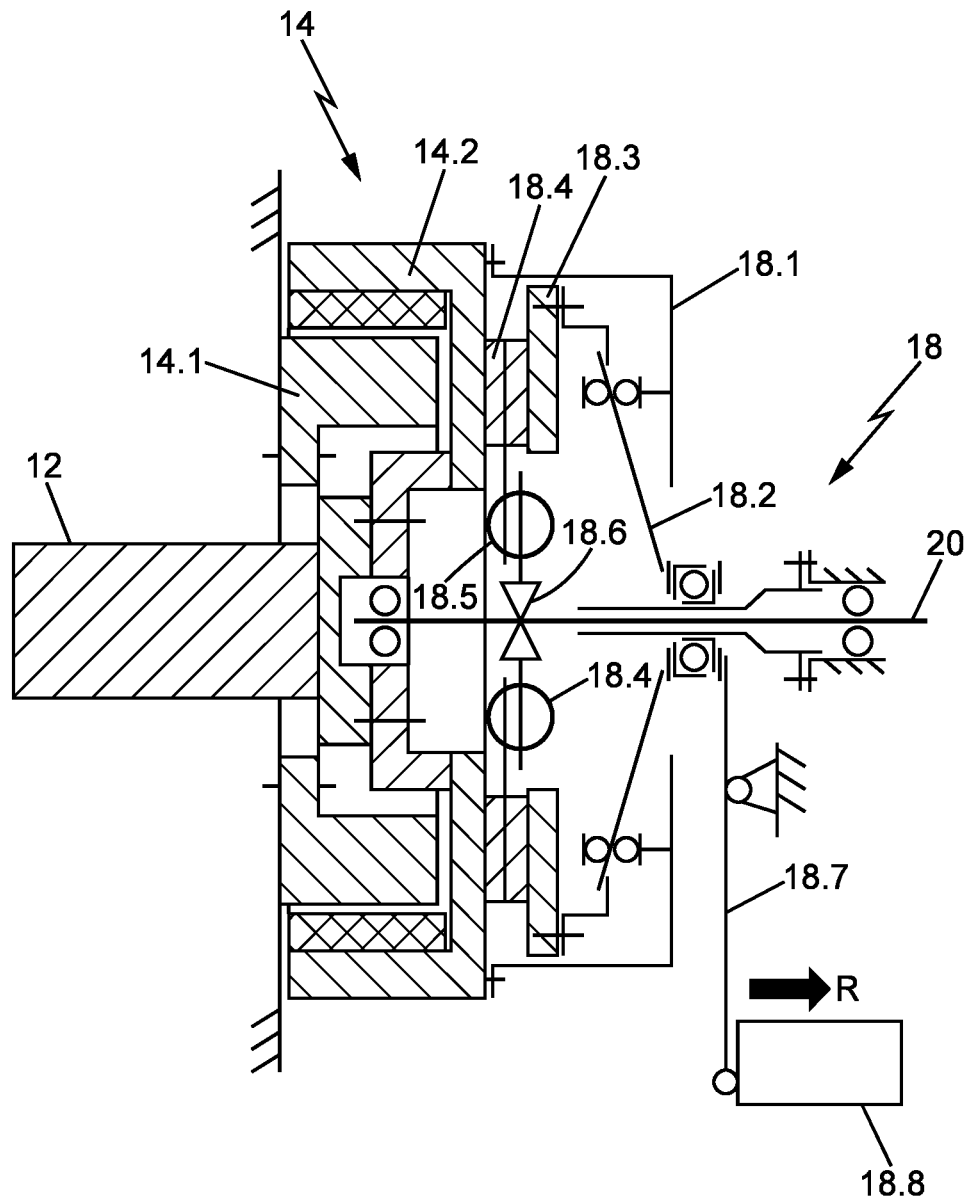
FIG. 2 is an enlarged view of the crankshaft, the first electric motor and the clutch portion of the internal combustion engine in FIG. 1.

FIGS. 1 and 2 illustrate an embodiment of a hybrid power drive system 10 according to the invention having a P1/P3 dual electric motor hybrid configuration. Specifically, the hybrid power drive 10 includes an internal combustion engine with a crankshaft 12, a first electric motor 14 and a second electric motor 16. Wherein the first and second electric motors have respective stators 14.1 and 16.1, and respective rotors 14.2 and 16.2. They are capable of operating in electric motor and generator modes.

The hybrid system 10 further includes a clutch 18 connected to the transmission 15 and the transmission 15 having a plurality of gears which are ultimately connected through a differential to a pair of driveshafts connected to the wheels (not shown) (half shaft) 40.

The first electric motor 14 is arranged at the rear end of the internal combustion engine, rigidly connected to the crankshaft 12 of the internal combustion engine. In the present invention, the first electric motor is an outer-rotor motor, the rotor 14.2 of which is located outside and rotates around the stator 14.1, the outer rotor 14.2 being rigidly fixed to the flywheel of the internal combustion engine for rigid connection with the crankshaft 12, or, in place of the flywheel, directly to the crankshaft for rigid connections.

The clutch 18 is arranged between the first electric motor and the transmission. The clutch is preferably a single-plate clutch. As shown in FIG. 2, it comprises the clutch housing 18.1, the clutch diaphragm spring 18.2, the clutch pressure plate 18.3 and the clutch friction plate 18.4 and other components.

A cavity is formed between the clutch housing 18.1 and the outer rotor of the first electric motor, and the clutch diaphragm spring 18.2, the clutch pressure plate 18.3 and the clutch friction plate 18.4 are arranged in the cavity.

The clutch pressure plate 18.3 and the clutch friction plate 18.4 are disc-shaped and arranged coaxially. The pressure plate 18.3 is combined with the clutch diaphragm spring 18.2 and can rotate together to form the active part of the clutch. The clutch friction plate 18.4 is located between the outer rotor 14.2 and the clutch pressure plate 18.3. In the present invention, a single plate clutch plate is used to simplify the overall structure.

Further, the clutch friction plate 18.4 further comprises a torque damper and a driven disc 18.6 in the center of the clutch, wherein the torque damper includes a plurality of torsional damper springs 18.5.

The clutch 18 further comprises a clutch actuator 18.8 that controls a pressure plate release mechanism, such as a clutch release fork 18.7, to control the engagement and disengagement of the clutch.

As shown in FIG. 2, when the clutch driver 18.6 is operating, the clutch release fork 18.7 is pushed along the direction R. This causes the clutch diaphragm spring 18.2 to deform elastically, thereby preventing the clutch pressure plate 18.3 from exerting pressure on the clutch friction plate

18.4 and causing the clutch friction plate 18.4 to disengage from the outer rotor 14.2. In this case, the clutch 18 is in the separation position and the power of the internal combustion engine is not transmitted to the clutch 18 via the crankshaft 12 and the outer rotor 14.2. When the clutch actuator 18.8 is not operating, the clutch release fork 18.7 no longer deforms the diaphragm spring 18.2, so that the diaphragm spring 18.2 presses against the clutch pressure plate 18.3 by spring force, thereby causing the pressure plate 18.3 to exert pressure on the clutch friction plate 18.4, resulting in the friction plates 18.4 being coupled with the outer rotor 14.2. In this case, the clutch 18 is in the engagement position, and the power of the internal combustion engine is transmitted to the clutch friction plate 18.4 through the crankshaft 12 and the outer rotor 14.2, causing the clutch plate 18.4 to rotate with the outer rotor 14.2, so that the power is transmitted through the clutch 18 to the transmission 15. At the same time, when the clutch 18 is in the engagement position, the friction torque of the clutch friction plate 18.4 is transmitted to the damping spring 18.5 of the torque damper, and the energy of the torsional vibration is consumed by these damping springs, so that the torsional vibration is rapidly attenuated, and then the power is smoothly transmitted to the driven disc 18.6, reducing the alternating stress on the power drive system.

The center of the driven plate 18.6 is provided with a connecting hole, such as a spline hole, for connecting with the transmission 15. The transmission 15 comprises the input shaft 20 and is connected to the clutch 18 through the connecting hole of the driven plate 18.6. For example, the input shaft 20 comprises a spline shaft that can be inserted and secured in a spline hole so that the input shaft 20 can be secured and rotated with the clutch plates 18.4.

The transmission 15 also comprises an output shaft 30, a drive gear 15.1, a differential gear 15.3 and a countershaft 15.8. The output shaft 30 is cylindrical and arranged coaxially with the input shaft 20 to rotate around the input shaft 20; the drive gear 15.1 is arranged on the output shaft 30. The countershaft 15.8 comprises gears 15.2a, 15.2b, wherein the drive gear 15.1 is connected to the differential gear 3 via gears 15.2a, 15.2b on the countershaft. With this arrangement, the torque input from the input shaft 20 can be finally transmitted to the drive shaft 40 through the output shaft 30, the drive gear 15.1, the countershaft gears 15.2a, 15.2b and the differential gear 15.3, in order to drive the wheels (not shown) mounted on the drive shaft.

Optionally, the transmission 15 also comprises a synchronizer 16 and a shift actuator 19. Where the synchronizer 16 is arranged on the output shaft 30, and the shift actuator 19 is configured to actuate the synchronizer between the neutral position N and the drive position D. In the neutral position N, the input shaft 20 is disengaged from the output shaft 30, and the rotational torque of the input shaft 20 is not transmitted to the output shaft 30. In the drive position D, the input shaft 20 is engaged with the output shaft 30, and the rotational torque of the input shaft 20 is transmitted to the output shaft 30. Preferably, the shift actuator 19 is an electronically controlled actuator.

Optionally, the transmission 15 also comprises a parking pawl 13 and a parking lock actuator 11 arranged on the output shaft 30. The parking lock actuator 11 is adapted to engage with or disengage from the parking pawl 13 to lock and unlock the rotation of the output shaft 30 when parking.

Preferably, the second electric motor 16 is located downstream of and coupled to the transmission 15. In this embodiment, the second electric motor 16 is connected to the countershaft gear 15.2a via the gear 15.4. Optionally, a second clutch (not shown) may be additionally provided between the second electric motor 16 and the transmission 15.

Preferably, the internal combustion engine comprises multiple cylinders and a cylinder deactivation device, which can selectively deactivate some of the cylinders according to engine operating conditions, so as to control waste emissions and reduce fuel consumption.

Figure 3A:
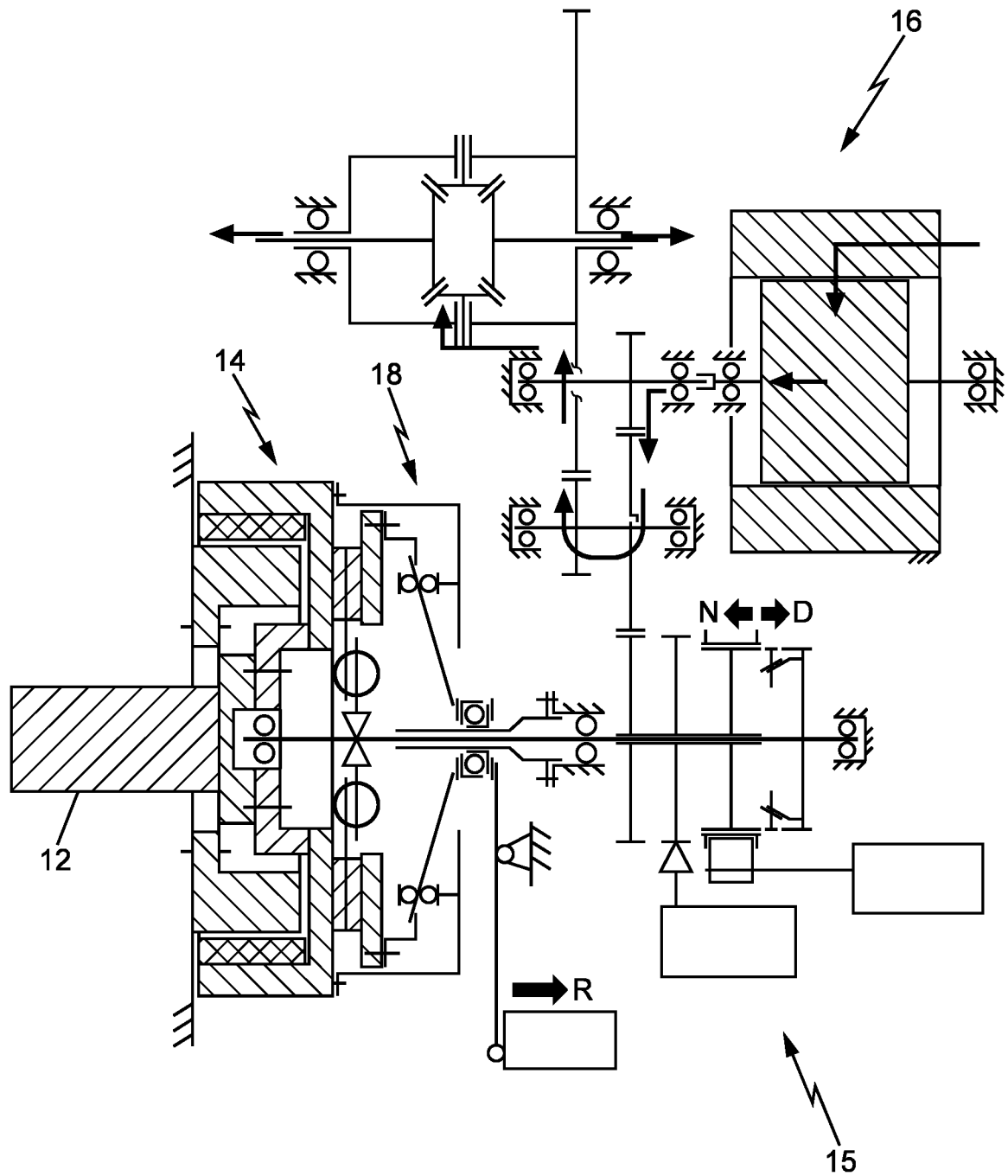
FIGS. 3a to 3c are schematic diagrams of different operation modes of the hybrid power drive system according to the present invention.

In addition, the hybrid power drive system according to the present invention also comprises a central processing unit (not shown) configured to operate the system in one of the following operation modes:

A pure electric drive mode, wherein the internal combustion engine and the first electric motor do not participate in the vehicle power output, and only the second electric motor participates in the power output. In this mode, as shown in FIG. 3a, only the second electric motor outputs torque, which is transmitted to the half shaft 40 through the transmission connected thereto, in order to drive the wheels. The arrows in the diagram represent the path that torque is transmitted through the power drive. This mode is especially suitable for vehicle low-speed condition, that is, when the vehicle speed is less than 50 kilometers per hour. At the same time, the internal combustion engine can selectively operate and drive the first electric motor to generate electricity and store it in the on-board battery.

Figure 3B:
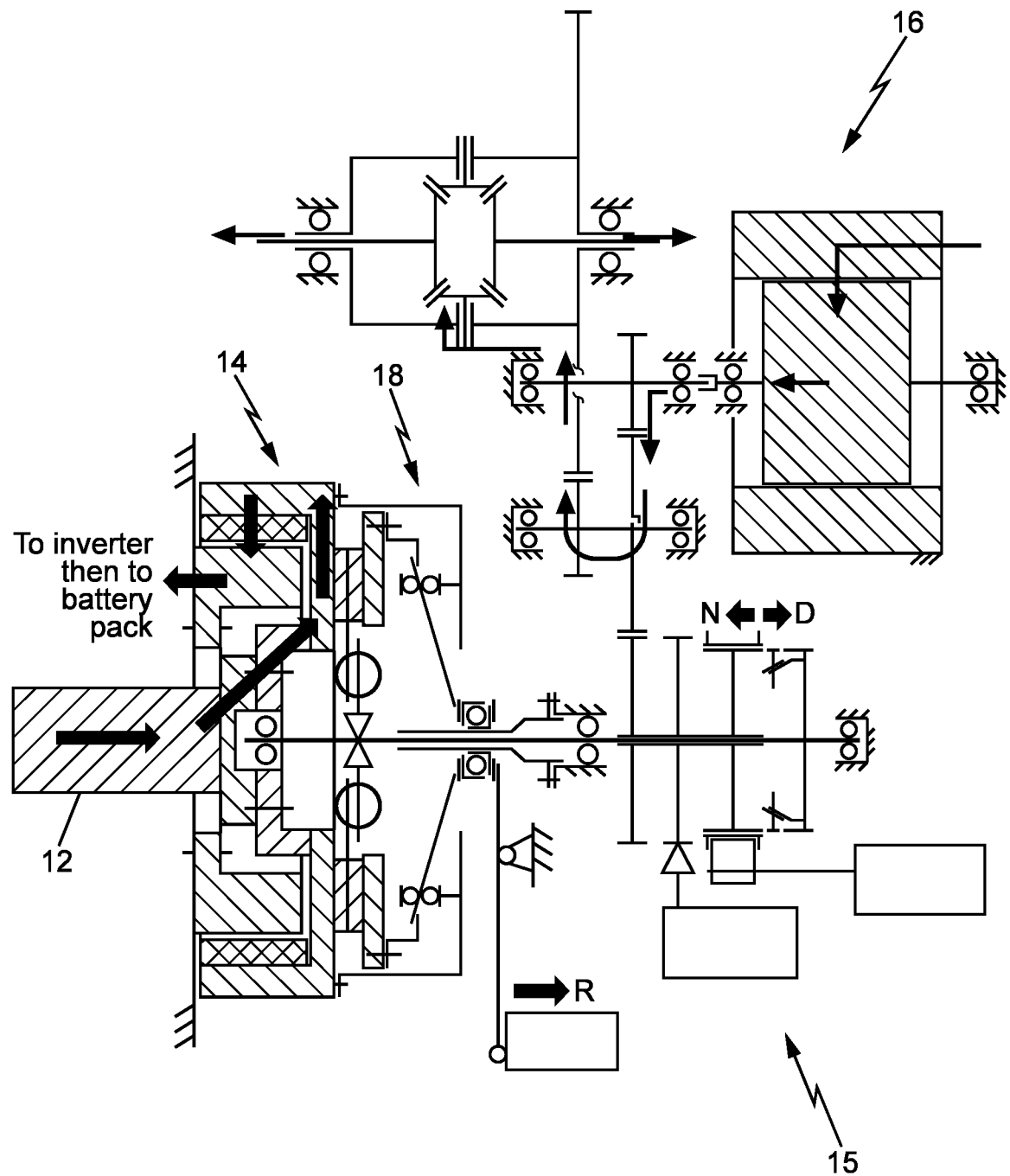

A hybrid drive mode in which the internal combustion engine, the first electric motor, and the second electric motor are simultaneously outputting power. As shown in FIG. 3b, in this mode, part of the power output by the internal combustion engine is used to generate electricity by the first electric motor, part of the power drives the wheels through the transmission, and the second electric motor also participates in outputting the torque, so that the vehicle has sufficient power. The arrows in the diagram represent the path that torque is transmitted through the power drive. This mode is especially suitable for vehicle medium and high-speed conditions, that is, when the vehicle speed is between 50 and 120 kilometers per hour.

Figure 3C:
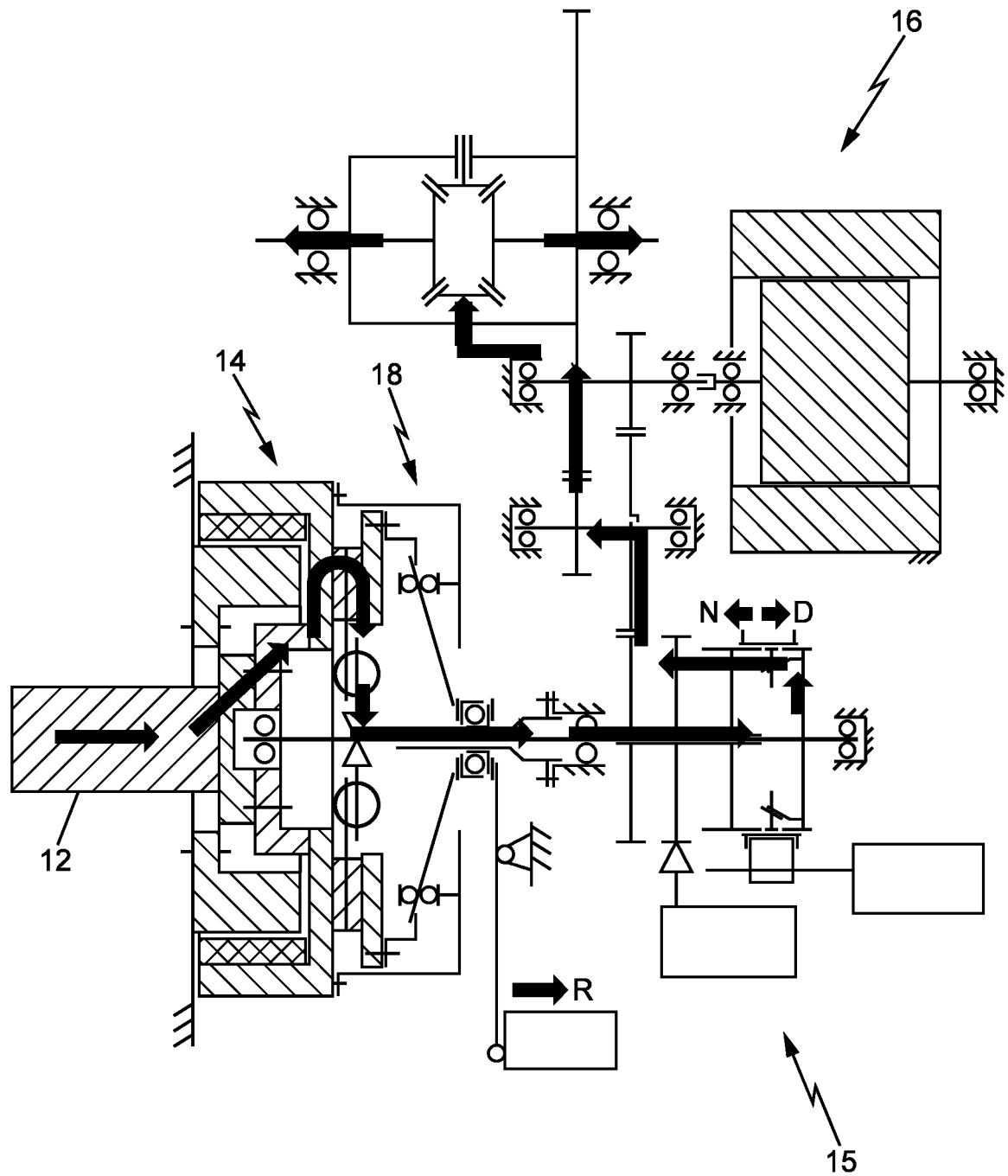

A direct drive mode in which the second electric motor is deactivated, and the internal combustion engine and the first electric motor are activated. As shown in FIG. 3c, in this mode, only the internal combustion engine is involved in the power supply of the wheels, and its operation mode is similar to that of an ordinary fuel vehicle, and the second electric motor no longer provides torque output. The arrows in the diagram represent the path that torque is transmitted through the power drive. This mode is especially suitable for vehicle high-speed condition, that is, when the vehicle speed is greater than 120 kilometers per hour.

In the present invention, the crankshaft of the internal combustion engine and the first electric motor are rigidly connected, thereby enabling direct and rapid bidirectional torque transmission. In addition, by using an outer rotor electric motor, the present invention is more compatible with internal combustion engines using cylinder deactivation technology. This can further reduce fuel consumption and improve the efficiency of the hybrid system. In addition, the simple structure of the present invention allows the use of a variety of low-cost components, such as single-plate clutches and automatic mechanical transmissions, lowering the overall manufacturing cost and facilitating later maintenance.

Those skilled in the art may envisage various embodiments and various modifications and improvements. In particular, it should be noted that, except for obvious contradictions or incompatibility, the features, modifications, and/or specific embodiments described in the present invention can be combined with each other. All these embodiments and modifications and improvements fall in the protection scope of the present invention.

The invention claimed is:

1. A hybrid power drive system comprising:
   an internal combustion engine having a crankshaft;
   a first electric motor which is an outer-rotor electric motor having an outer-rotor which is rigidly coupled with the crankshaft and rotates with the crankshaft;
   a transmission having an input shaft, an output shaft, a drive gear, a differential gear and a countershaft, wherein the output shaft is cylindrical and coaxially arranged with the input shaft to rotate around the input shaft, the drive gear is disposed on the output shaft, and the countershaft has gears, wherein the drive gear is coupled, via the gears of the countershaft, to the differential gear;
   a second electric motor connected to one of the countershaft gears via a gear; and
   a clutch, which is disposed between the first electric motor and the transmission and is coupled with the input shaft of the transmission, wherein the clutch is configured to be switched between the following two positions:
   an engagement position, wherein the clutch engages with the outer-rotor; and
   a separation position, wherein the clutch disengages from the outer-rotor.

2. The hybrid power drive system according to claim 1, wherein the clutch is a single plate clutch.

3. The hybrid power drive system according to claim 2, wherein the clutch comprises a single plate and a clutch actuator, wherein the clutch actuator is adapted to engage the single plate with the outer-rotor when the clutch is in the engagement position, and to disengage the single plate from the outer-rotor when the clutch is in the separation position.

4. The hybrid power drive system according to claim 2, wherein the clutch comprises a torque damper which is integrated with the single plate, wherein the torque damper comprises a spline hole, and the transmission comprises a spline shaft which is coupled with the input shaft and engages into the spline hole.

5. The hybrid power drive system according to claim 1, wherein the transmission further comprises a synchronizer and a shift actuator, wherein the synchronizer is disposed on the output shaft and the shift actuator is configured to actuate the synchronizer to engage or disengage the input shaft with the output shaft.

6. The hybrid power drive system according to claim 5, wherein the transmission further comprises a park pawl disposed on the output shaft and a parking lock actuator, wherein the parking lock actuator is adapted to engage with or disengage from the park pawl, so as to lock and unlock the rotation of the output shaft.

7. The hybrid power drive system according to claim 1, wherein the second electric motor is arranged downstream of the transmission.

8. The hybrid power drive system according to claim 7, wherein the hybrid power drive system further comprises a central processing unit configured to operate the system in one of the following operation modes:
   pure electric drive mode, wherein the internal combustion engine and the first electric motor are not involved in vehicle power output, and only the second electric motor is involved in the power output;
   hybrid drive mode, wherein the internal combustion engine, the first and the second electric motors are together involved in power output; or
   direct drive mode, wherein the second electric motor is not involved in vehicle power output, and the internal combustion engine and the first electric motor are involved in the power output.

9. The hybrid power drive system according to claim 1, wherein the internal combustion engine includes a plurality of cylinders connected to the crankshaft and comprises a cylinder deactivation apparatus configured to selectively deactivate at least one of the plurality of cylinders.

* * * * *